US012317282B2

(12) United States Patent
Zhao et al.

(10) Patent No.: US 12,317,282 B2
(45) Date of Patent: May 27, 2025

(54) RESOURCE SELECTION METHOD AND TERMINAL DEVICE

(71) Applicant: GUANGDONG OPPO MOBILE TELECOMMUNICATIONS CORP., LTD., Guangdong (CN)

(72) Inventors: Zhenshan Zhao, Guangdong (CN); Huei-Ming Lin, South Yarra (AU); Yi Ding, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 354 days.

(21) Appl. No.: 17/817,868

(22) Filed: Aug. 5, 2022

(65) Prior Publication Data

US 2022/0386284 A1 Dec. 1, 2022

Related U.S. Application Data

(63) Continuation of application No. PCT/CN2020/074546, filed on Feb. 7, 2020.

(51) Int. Cl.
*H04W 72/23* (2023.01)
*H04W 24/08* (2009.01)
*H04W 72/51* (2023.01)

(52) U.S. Cl.
CPC ........... *H04W 72/23* (2023.01); *H04W 24/08* (2013.01); *H04W 72/51* (2023.01)

(58) Field of Classification Search
CPC ..... H04W 72/23; H04W 24/08; H04W 72/51; H04W 72/56; H04W 72/541;
(Continued)

(56) References Cited

U.S. PATENT DOCUMENTS

2017/0048888 A1 2/2017 Belleschi
2017/0079069 A1 3/2017 Wang et al.
(Continued)

FOREIGN PATENT DOCUMENTS

AU 2014250616 A1 11/2014
CN 105101300 A 11/2015
(Continued)

OTHER PUBLICATIONS

Office Action of the Indian application No. 202217045799, issued on Aug. 31, 2023. 6 pages with English translation.
(Continued)

*Primary Examiner* — Tejis Daya
(74) *Attorney, Agent, or Firm* — PERKINS COIE LLP

(57) ABSTRACT

A resource selection method, a terminal device, a chip, a computer-readable storage medium, a computer program product and a computer program are provided. The method comprises: a first terminal device performing resource selection at time n, and the first terminal device determining, according to an interception result, a transmission resource used for transmitting sidelink data, wherein the interception result comprises at least one of the following: an interception result obtained by the first terminal device performing interception at at least one time unit after the time n; and an interception result obtained by the first terminal device performing interception at at least one time unit before the time n.

18 Claims, 16 Drawing Sheets

(58) Field of Classification Search
CPC ........... H04W 72/542; H04W 72/0446; H04W 74/0808; H04W 72/02; H04B 17/382

See application file for complete search history.

(56) References Cited

U.S. PATENT DOCUMENTS

| | | | |
|---|---|---|---|
| 2019/0075548 A1 | 3/2019 | Lee et al. | |
| 2019/0182840 A1* | 6/2019 | Feng | H04W 72/563 |
| 2019/0313405 A1* | 10/2019 | Li | H04W 72/542 |
| 2020/0029245 A1* | 1/2020 | Khoryaev | H04W 36/22 |
| 2020/0229171 A1* | 7/2020 | Khoryaev | H04W 4/40 |
| 2020/0296691 A1 | 9/2020 | Lee et al. | |
| 2020/0296692 A1 | 9/2020 | Lee et al. | |
| 2021/0127365 A1* | 4/2021 | Wang | H04W 72/542 |
| 2021/0144736 A1* | 5/2021 | Li | H04W 72/02 |
| 2021/0400638 A1 | 12/2021 | Lee et al. | |
| 2022/0061095 A1* | 2/2022 | Xue | H04W 80/02 |

FOREIGN PATENT DOCUMENTS

| | | |
|---|---|---|
| CN | 106664568 A | 5/2017 |
| CN | 109391976 A | 2/2019 |
| CN | 109565793 A | 4/2019 |
| CN | 110120844 A | 8/2019 |
| CN | 110267226 A | 9/2019 |
| CN | 110710292 A | 1/2020 |
| WO | 2017095277 A1 | 6/2017 |
| WO | 2019091143 A1 | 5/2019 |

OTHER PUBLICATIONS

First Office Action of the European application No. 20917548.8, issued on Sep. 12, 2023. 6 pages.

NTT Docomo, Inc."Transmitter UE behaviour for sensing-based resource allocation". 3GPP TSG RAN WG1 Meeting #85 R1-165192, http://www.3gpp.org/ftp/tsg_ran/WGI_RLI/TSGRI_85/Docs/, May 14, 2016 (May 14, 2016), section 2 to 4, in figure 1. (7 pages).

ZTE, "Details of resource selection using partial sensing by P-UEs". 3GPP TSG RAN WG1 Meeting #85 3GPP TSG RAN WGI Meeting#86bis R1-1609806, http://www.3gpp.org/ftp/tsg ran/WG1_RL1/TSGR1_86b/Docs/, Sep. 30, 2016(Sep. 30, 2016), section 2-3. (3 pages).

International Search Report in the international application No. PCT/CN2020/074546, mailed on Nov. 9, 2020 with English translation (7 pages).

Written Opinion of the International Search Authority in the international application No. PCT/CN2020/074546, mailed on Nov. 9, 2020 with English translation (11 pages).

Nokia, "Introduction of NR V2X", 3GPP TSG-RAN WG1 Meeting #99 R1-1913643, Reno, USA, Nov. 18-22, 2019. (8 pages).

3GPP TS 36.213 V15.7.0 (Sep. 2019), "3rd Generation Partnership Project; Technical Specification Group Radio Access Network; Evolved Universal Terrestrial Radio Access (E-UTRA); Physical layer procedures (Release 15)", p. 477-p. 533.

Intel Corporation:"Resource Allocation Mode-2 for NR V2X Sidelink Communication", 3GPP Draft; R1-1910650, vol. RAN WG1, No. Chongqing, China; Oct. 8, 2019, 28 pages.

Huawei et al: "Sidelink resource allocation mode 2 for NR V2X", 3GPP Draft; R1-1911884, vol. RAN WG1, No. Reno, USA Nov. 9, 2019 (Nov. 9, 2019), 14 pages.

Supplementary European Search Report in the European application No. 20917548.8, mailed on Dec. 14, 2022. 12 pages.

Intel Corporation, "Summary for AI 7.2.4.2.2 Mode-2 Resource Allocation", 3GPP TSG RAN WG1 Meeting #96bis R1-1905652, Xi'an, China, Apr. 8-12, 2019, pp. 1-24.

Second Office Action of the Chinese application No. 202211166391. 5, issued on Sep. 5, 2024. 22 pages with English translation.

Notice of Allowance of the Chinese application No. 202211166391. 5, issued on Nov. 20, 2024. 7 pages with English translation.

* cited by examiner

A first terminal device performs resource selection at time n, and determines a transmission resource for transmitting sidelink data according to a sensing result — 21

FIG. 2

RESOURCE SELECTION METHOD AND TERMINAL DEVICE

CROSS-REFERENCE TO RELATED APPLICATION

This is a continuation application of International Patent Application No. PCT/CN2020/074546, filed on Feb. 7, 2020, entitled "RESOURCE SELECTION METHOD AND TERMINAL DEVICE", the disclosure of which is hereby incorporated by reference in its entirety.

BACKGROUND

Device-To-Device (D2D) communication is a Sidelink (SL) based transmission technology. A D2D system adopts the terminal-to-terminal direct communication. In 3GPP, D2D is divided into different stages for research, including Vehicle-to-Everything (V2X). Under a transmission mode in D2D/V2X, a vehicle terminal selects a resource from a resource pool for data transmission. During the processing of selecting resources, the terminal may select a transmission resource from the resource pool by means of sensing. In the related art, a solution of performing resource selection by means of complete sensing is mainly provided, or a solution of performing resource selection by means of partial sensing for periodic services is provided. However, a solution of performing resource selection by means of partial sensing for non-periodic services is not provided.

SUMMARY

The present application relates to the field of communication technologies, and in particular, to a resource selection method, a terminal device, a chip, a computer-readable storage medium, a computer program product, and a computer program. In order to resolve the above technical problem, embodiments of the present invention provide a resource selection method, a terminal device, a chip, a computer-readable storage medium, a computer program product, and a computer program.

According to a first aspect, there is provided a resource selection method. The method includes the following operations.

A first terminal device performs resource selection at time n, and determines a transmission resource for transmitting sidelink data according to a sensing result.

The sensing result includes at least one of the following:
a sensing result that is obtained by the first terminal device performing sensing on at least one time unit after the time n; and
a sensing result that is obtained by the first terminal device performing sensing on at least one time unit before the time n.

According to a second aspect, there is provided a terminal device. The terminal device includes a processing unit.

The processing unit is configured to perform resource selection at time n, and determine a transmission resource for transmitting sidelink data according to a sensing result.

The sensing result includes at least one of the following:
a sensing result that is obtained by performing sensing on at least one time unit after the time n; and
a sensing result that is obtained by performing sensing on at least one time unit before the time n.

According to a third aspect, there is provided a terminal device. The terminal device includes a processor and a memory configured to store a computer program executable by the processor.

The memory is configured to store the computer program, and the processor is configured to call and execute the computer program stored in the memory, to perform steps of the foregoing method.

According to a fourth aspect, there is provided a chip. The chip includes a processor, which is configured to call and execute a computer program in a memory, to cause a device installed with the chip to perform the foregoing method.

According to a fifth aspect, there is provided a computer-readable storage medium. The computer-readable storage medium is configured to store a computer program, and the computer program causes a computer to perform steps of the foregoing method.

According to a sixth aspect, there is provided a computer program product. The computer program product includes computer program instructions. The computer program instructions cause a computer to perform the foregoing method.

According to a seventh aspect, there is provided a computer program. The computer program causes a computer to perform the foregoing method.

BRIEF DESCRIPTION OF THE DRAWINGS

FIG. 2 is a schematic flowchart of a resource selection method according to an embodiment of the present application.

DETAILED DESCRIPTION

In order to understand the features and technical contents of the embodiments of the present invention in more detail, the implementation of the embodiments of the present invention are described in detail below with reference to the drawings, which are for reference only and are not intended to limit the embodiments of the present invention.

The technical solutions in the embodiments of the present application will be described below with reference to the drawings in the embodiments of the present application. It is apparent that the described embodiments are only part of the embodiments of the present application, not all the embodiments. All other embodiments obtained by those of ordinary skill in the art on the basis of the embodiments in the present application without creative work all fall within the scope of protection of the present application.

The technical solutions of the embodiments of the present application are applicable to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system, or a 5G system.

Figure 1A:
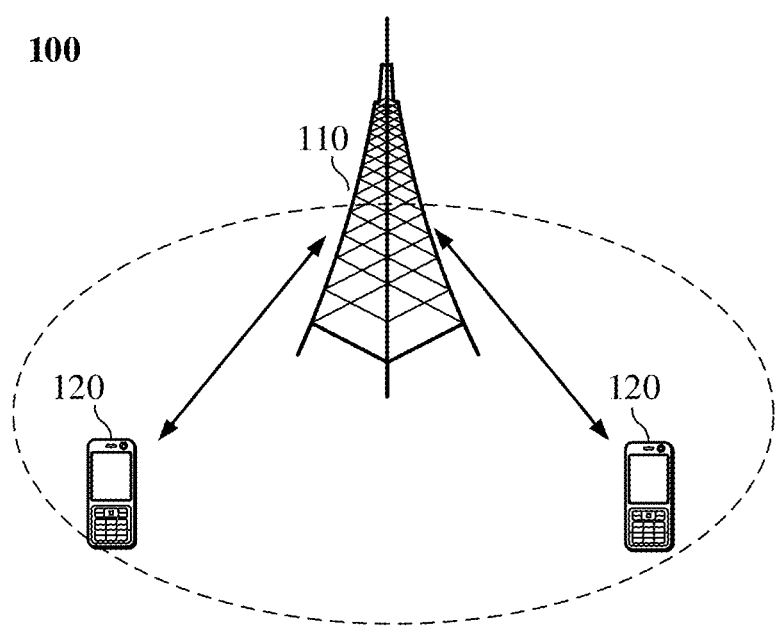
FIG. 1A is a schematic diagram of a communication system architecture according to an embodiment of the present application.

Exemplarily, a communication system 100 applied in an embodiment of the present application may be illustrated in FIG. 1A. The communication system 100 may include a network device 110. The network device 110 may be a device communicating with UE 120 (or called a communication terminal device or a terminal device). The network device 110 may provide communication coverage for a specific geographical region, and may communicate with User Equipment (UE) located in the coverage region. Optionally, the network device 110 may be a Base Transceiver Station (BTS) in the GSM or the CDMA system, or may be a NodeB (NB) in the WCDMA system, and may further be an Evolutional Node B (eNB or eNodeB) in the LTE system or a wireless controller in a Cloud Radio Access Network (CRAN). Alternatively, the network device may be a mobile switching center, a relay station, an access point, a vehicle device, a wearable device, a hub, a switch, a network bridge, a router, a network-side device in a 5G network, a network device in a future evolved Public Land Mobile Network (PLMN), or the like.

The communication system 100 further includes at least one UE 120 within the coverage of the network device 110. The "UE" used herein includes, but is not limited to, an apparatus configured to receive/transmit a communication signal through a wired line connection, for example, through Public Switched Telephone Network (PSTN), Digital Subscriber Line (DSL), digital cable, and direct cable connections, and/or another data connection/network), and/or through a wireless interface, for example, for a cellular network, a Wireless Local Area Network (WLAN), a digital television network like a DVB-H network, a satellite network and an AM-FM broadcast transmitter, and/or an apparatus of another UE configured to receive/transmit the communication signal, and/or an Internet of Things (IoT) device. The UE configured to communicate through a wireless interface may be called as a "wireless communication terminal device", a "wireless terminal device", or a "mobile terminal device".

Optionally, terminal Device to Device (D2D) communication may be achieved among UE 120.

Figure 1B:
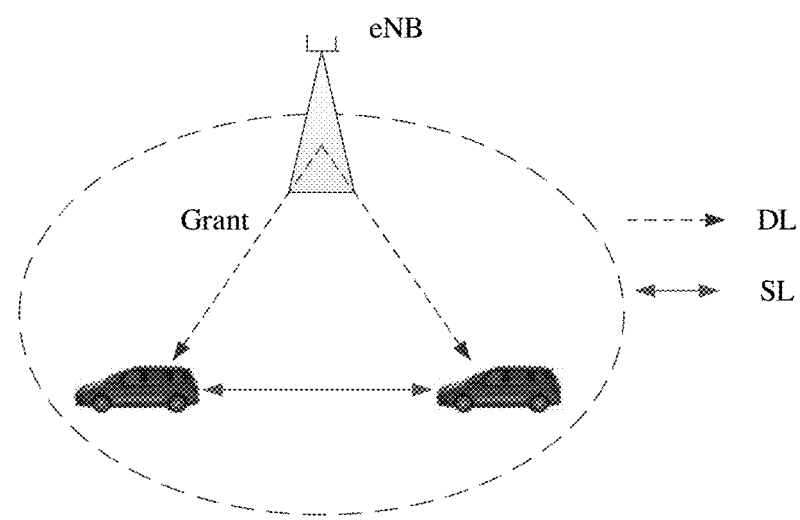
FIG. 1B to FIG. 1F are schematic diagrams of composition scenarios of D2D and V2X.
Figure 1C:
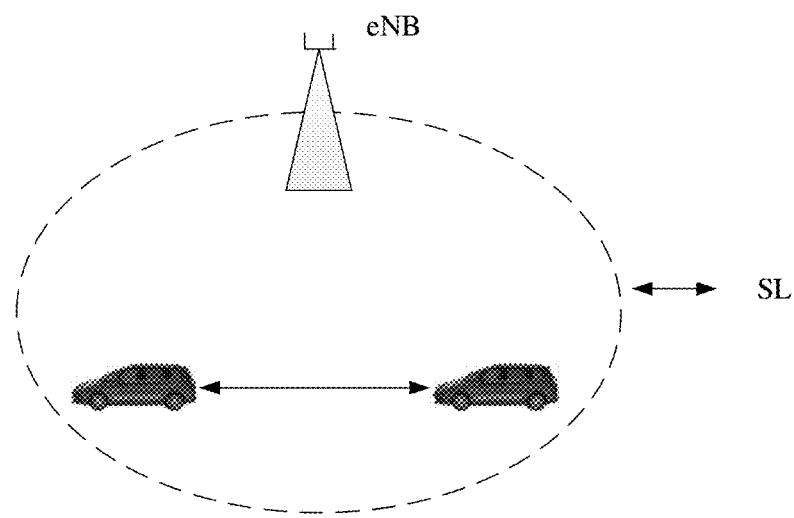

D2D communication is a Sidelink (SL) based transmission technology. As illustrated in FIG. 1B and FIG. 1C, an Internet of vehicles system is based on the D2D communication technology. 3GPP defines two transmission modes: a mode A and a mode B.

In mode A, a transmission resource of a terminal is allocated by a base station, and the terminal transmits data on an SL according to the resource allocated by the base station. The base station may allocate a single transmission resource to the terminal, or may allocate a semi-static transmission resource to the terminal.

In mode B, a vehicle terminal selects a resource from a resource pool for data transmission.

NR-V2X: In NR-V2X, automatic driving is required. Therefore, a higher requirement is proposed for data interaction between vehicles, for example, higher throughput, shorter time delay, higher reliability, larger coverage, and more flexible resource allocation.

Figure 1D:
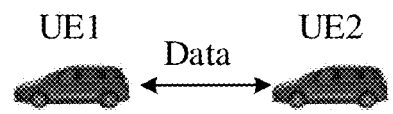
Figure 1E:
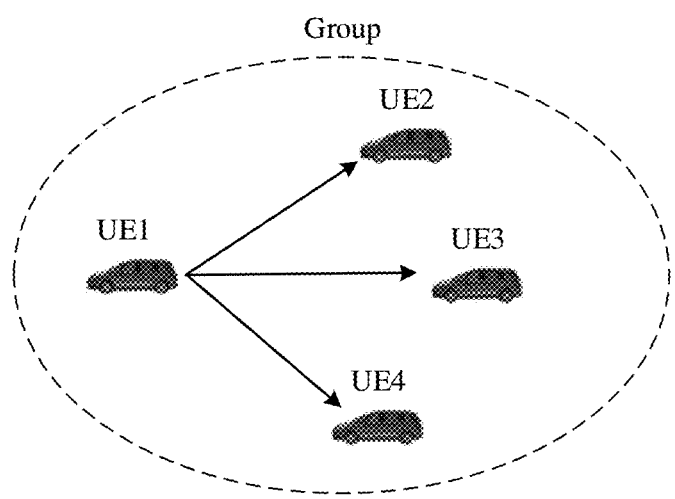
Figure 1F:
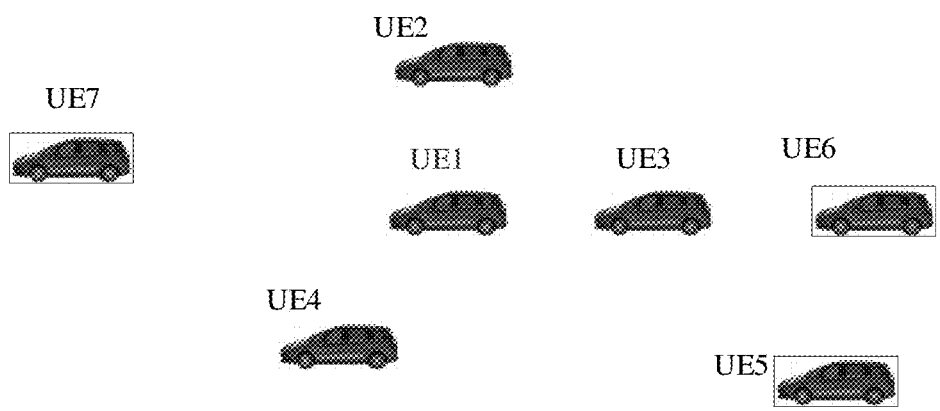
Figure 1G:
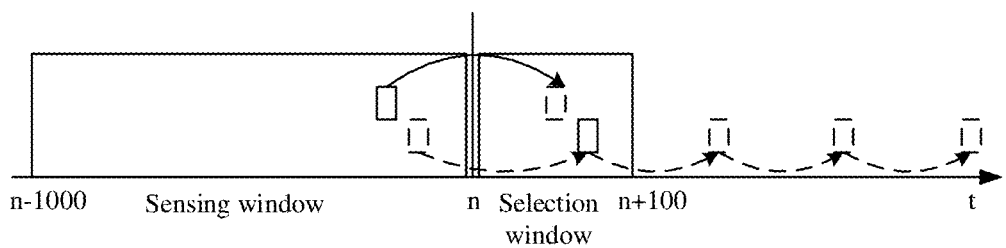
FIG. 1G is a schematic scenario diagram of complete sensing.

LTE-V2X supports a broadcast transmission mode. In NR-V2X, a unicast and multicast transmission mode is introduced. For unicast transmission, there is only one terminal on a receiving terminal. As illustrated in FIG. 1D, unicast transmission is achieved between UE 1 and UE 2. For multicast transmission, a receiving terminal is all terminals in a communication group, or all terminals in a certain transmission distance. As illustrated in FIG. 1E, UE 1, UE 2, UE 3, and UE 4 form a communication group. The UE 1 transmits data, and other terminal devices in the group are all receiving terminals. For the broadcast transmission mode, the receiving terminal is any terminal. As illustrated in FIG. 1F, the UE 1 is a transmitting terminal, and other terminals around the transmitting terminal are all receiving terminals.

In V2X, a method for performing resource selection by means of sensing may include the following.

LTE-V2X supports complete sensing or partial sensing. Complete sensing means that the terminal may sense data transmitted by other terminal in all slots (or subframes) except the slot for transmitting the data. Partial sensing means that, in order to achieve the energy saving of the terminal, the terminal only needs to sense partial slots (or subframes), and resource selection is performed based on results of partial sensing.

Specifically, when a high layer is not configured with partial sensing, that is, resource selection is performed by means of complete sensing by default. The standard (3GPP TS36.213) defines a process of performing resource selection based on complete sensing. Main steps of performing resource selection based on complete sensing are briefly introduced below.

As illustrated in FIGS. 1 to 7, when a new data package arrives at time n, resource selection is required to be performed. The terminal performs resource selection within [n+T1, n+T2] milliseconds according to a sensing result in 1 second, where T1<=4, and $T_{2min}(prio_{TX}) \le T_2 \le 100$. The selection of T1 should be greater than the processing time delay of the terminal, and the selection of T2 is required to be within a time delay requirement range. For example, if a time delay requirement of a service is 50 ms, 20<=T2<=50; and if the time delay requirement of the service is 100 ms, 20<=T2<=100.

A process that the terminal performs resource selection in a selection window includes the following steps.

In the first step, the terminal uses all available resources in the selection window as a set 1, and the terminal performs an exclusion operation on the resources in the set 1.

In the second step, if the terminal has no sensing results in some subframes within a sensing window, resources of these subframes on the corresponding subframes in the selection window are excluded.

In the third step, if the terminal detects PSCCH in the sensing window, RSRP of the scheduled PSSCH is measured. If the measured PSSCH-RSRP is higher than a PSSCH-RSRP threshold, and there is a resource conflict between reserved transmission resources determined according to reserved information in control information and data to be transmitted by a user, the user excludes the resource from the set 1. The selection of the PSSCH-RSRP threshold is determined by priority information carried by the detected PSCCH and the priority of data to be transmitted by the terminal.

In the fourth step, if the number of resources remaining in a set A is less than 20% of the total number of resources, the terminal enhances a threshold 3 dB of PSSCH-RSRP, and steps 1 to 2 are repeated, until the number of resources remaining in the set 1 is greater than 20% of the total number of resources.

In the fifth step, terminal performs Sidelink Received Signal Strength Indicator (S-RSSI) detection on the resources remaining in the set 1, and sorts the resources according to an energy level, so that 20% (relative to the number of the resources in the set 1) resources with the lowest energy are put into a set 2.

In the sixth step, the terminal equiprobably selects a resource from the set 2 for data transmission.

Specific steps may include the following.

1) A candidate single subframe resource $R_{x,\ y}$ for PSSCH transmission is defined as a set of consecutive subchannels $L_{subCH}$ of a subchannel x+j included in a subframe $t_y^{SL}$, where j=0, . . . , $L_{subCH}-1$. The terminal device assumes that any consecutive subchannel set $L_{subCH}$ included in a corresponding PSSCH resource pool (described in 14.1.5) within a time interval $[n+T_1, n+T_2]$ corresponds to the candidate single subframe resource, the selection of $T_1$ and $T_2$ depends on the implementation of the terminal device under $T_1 \leq 4$ and $T_{2min}$ ($prio_{TX}$)$\leq T_2 \leq 100$. If $prio_{TX}$ in $T_{2min}$ ($prio_{TX}$) is provided by the high layer, $20 \leq T_2 \leq 100$. $T_2$ selected by the terminal device should meet a waiting time requirement. The total number of the candidate single subframe resources is represented as $M_{total}$.

2) Except for the subframes in which the transmission occurs, the terminal device senses the subframes $t_{n'-10\times P_{step}}^{SL}$, $t_{n'-10\times P_{step}+ji\ SL}$, . . . , $t_{n'-1}^{SL}$. If the subframe n belongs to a set ($t_0^{SL}$, $t_1^{SL}$, . . . , $t_{T_{max}}^{SL}$), $t_n'^{SL}$=n, otherwise the subframe $t_n'^{SL}$ is the first subframe after the subframe n belongs to the set ($t_0^{SL}$, $t_1^{SL}$, . . . , $t_{T_{max}}^{SL}$). The terminal device performs the following steps based on PSCCH decoding and S-RSSI measured in these subframes.

3) A parameter $Th_{a,b}$ is set to a value indicated by an ith SL-ThresPSSCH-RSRP field, where SL-ThresPSSCH-RSRP is in an SL-ThresPSSCH-RSRP-List, and i=a*8+b+1.

4) A set $S_A$ is initialized into a union set of all the candidate single subframe resources. A set $S_B$ is initialized into a null set.

5) If all of the following conditions are met, the terminal device excludes any candidate single subframe resource $R_{x,\ y}$ from the set $S_A$.

At step 2), the subframe $t_z^{Sl}$ is not sensed by the terminal device.

An integer j meets $y+j\times P'_{rsvp\_TX}= z+P_{step}\times k\times q$, where j=0, 1, . . . , $C_{resel}-1$, $P'_{rsvp\_TX}=P_{step}\times P_{rsvp\_TX}/100$, k is any value allowed by a high layer parameter strictResourceReservationPeriod, and q=1, 2, . . . , Q. Herein, $$Q = \frac{1}{k}$$

if k<1 and n'− $z \leq P_{step} \times k$. If the subframe n belongs to the set $t_0^{SL}$, $t_1^{SL}$, . . . , $t_{T_{max}}^{SL}$, $t_n'^{SL}$=n, otherwise, the subframe $t_n'^{SL}$ is the first subframe belonging to the set $t_0^{SL}$, $t_1^{SL}$, . . . , $t_{T_{max}}^{SL}$ after the subframe n; otherwise, Q=1.

6) If all of the following conditions are met, the terminal device excludes the candidate single subframe resource $R_{x,\ y}$ from the set $S_A$.

The terminal device receives an SCI format 1 in the subframe $t_m^{SL}$, and according to provisions of Section 14.2.1, a "resource reservation" field and a "priority" field in the received SCI format 1 respectively indicate $P_{rsvp\_RX}$ and $prio_{RX}$.

A PSSCH-RSRP measured value of the received SCI format 1 is higher than $Th_{prio_{TX},prio_{RX}}$.

The SCI format received in the subframe $t_m^{SL}$, or assuming the same SCI format 1 (determined according to 14.1.1.4C) received in the subframe $t_{m+q\times P_{step}\times P_{rsvp\_RX}}^{SL}$, a set of resource blocks, and the subframes overlap $R_{x,\ y+j\times P'_{rsvp\_TX}}$ for q=1, 2, . . . , Q and j=0, 1, . . . , $C_{resel}-1$. Herein, $$Q = \frac{1}{P_{rsvp\_RX}}$$

if $P_{rsvp\_RX}<1$ and n'−m$\leq P_{step} \times P_{rsvp\_RX}$, if the subframe n belongs to the set ($t_0^{SL}$, $t_1^{SL}$, . . . , $t_{T_{max}}^{SL}$), $t_n'^{SL}$=n, otherwise, the subframe $t_n'^{SL}$ is the first subframe belonging to ($t_0^{SL}$, $t_1^{SL}$, . . . , $t_{T_{max}}^{SL}$) after the subframe n; otherwise, Q=1.

7) If the number of the candidate single subframe resources remaining in the set $S_A$ is less than $0.2 \cdot M_{total}$, step 4) is repeated, and $Th_{a,b}$ is increased by 3 dB.

8) For the candidate single subframe resources $R_{x,\ y}$ remaining in the set $S_A$, a measure standard $E_{x,\ y}$ is defined as a linear mean value that senses S-RSSI measured in the subchannel x+k of the subframe in step 2), where k=0, . . . , $L_{subCH}-1$. If $P_{rsvp\_TX} \geq 100$, it may represent $t_{y-P_{step}*j}^{SL}$ for a non-negative integer j, otherwise, it represents $t_{y-P'_{rsvp\_TX}*j}^{SL}$ for a non-negative integer j.

9) The terminal device moves the candidate single subframe resource $R_{x,\ y}$ with minimum metric $E_{x,\ y}$ from the set $S_A$ to $S_B$. This step is repeated, until the number of the candidate single subframe resources in the set $S_B$ is greater than or equal to $0.2 \cdot M_{total}$.

10) When the terminal device is configured by the high layer to use resource pools on a plurality of carriers for transmission, if the terminal device does not support the transmission of the candidate single subframe resources in the carriers, the candidate single subframe resources $R_{x,\ y}$ are excluded from the set $S_B$. Due to limitation of the number of the carriers simultaneously transmitted, the limitation of supported carrier combinations, or the interruption [10] of RF retuning time, the selected resources are used in other carriers for transmission.

The terminal device reports the set $S_B$ to the high layer.

Compared with complete sensing, partial sensing based terminal selects Y subframes from the resource selection window, and determines whether resources on Y subframes may be used as candidate resources according to the sensing result. If so, the resources are put into the set $S_B$. If the number of elements in the set $S_B$ is greater than or equal to 20% of the total number of resources, $S_B$ is reported to the high layer.

Details may include the following.

1) The candidate single subframe resource $R_{x,y}$ for PSSCH transmission is defined as the set of consecutive subchannels $L_{subCH}$ having a subchannel x+j in the subframe $t_y^{SL}$, where j=0, . . . , $L_{subCH}$−1. The terminal device determines a set of subframes through implementation. The subframe set is composed of at least Y subframes in a time interval [n+$T_1$, n+$T_2$]. $T_1$ and $T_2$ are implemented by the terminal device, $T_1 \leq 4$. In addition, if $prio_{TX}$ in $T_{2min}$ ($prio_{TX}$) is provided by the high layer, $T_{2min}$ ($prio_{TX}$)≤$T_2$≤100; otherwise, 20≤$T_2$≤100. $T_2$ selected by the terminal device should meet the waiting time requirement, and Y should be greater than or equal to a high layer parameter minNumCandidateSF. Assuming that any consecutive subchannel set $L_{subCH}$ of the terminal device included in the corresponding PSSCH resource pool (described in 14.1.5) in the determined subframe set corresponds to the candidate single subframe resource. The total number of the candidate single subframe resources is represented as $M_{total}$.

2) If the subframe set in step 1) includes a subframe $t_y^{SL}$, and if a kth position of a high layer parameter gapCandidateSensing is set to 1, the terminal device can select any subframe $t_{y-k \times P_{step}}^{SL}$. The terminal device decodes PSCCH in these subframes, measures S-RSSI, and should perform the following behaviors according to the following steps.

3) A parameter $Th_{a,b}$ is set to a value indicated by an ith SL-ThresPSSCH-RSRP field in the SL-ThresPSSCH-RSRP-List, where i=a*8+b+1.

4) A set $S_A$ is initialized into a union set of all the candidate single subframe resources. The set $S_B$ is initialized into a null set.

5) If all of the following conditions are met, the terminal device excludes any candidate single subframe resource $R_{x,y}$ from the set $S_A$.

The terminal device receives the SCI format 1 in the subframe $t_m^{SL}$, and according to Section 14.2.1, the "resource reservation" field and the "priority" field in the received SCI format 1 respectively indicate values $P_{rsvp\_RX}$ and $prio_{RX}$.

A PSSCH-RSRP measured value of the received SCI format 1 is higher than $Th_{prio_{TX},prio_{RX}}$.

The SCI format received in the subframe $t_m^{SL}$, or assuming the same SCI format 1 (determined according to 14.1.1.4C) received in the subframe $t_{m+q \times P_{step} \times P_{rsvp\_RX}}^{SL}$, a set of resource blocks, and the subframes overlap $R_{x,y+j \times P'_{rsvp\_TX}}$ for q=1, 2, . . . , Q and j=0, 1, . . . $C_{resel}$−1. Herein, if $P_{rsvp\_RX}$<1 and y'−m≤$P_{step} \times P_{rsvp\_RX}+P_{step}$, $$Q = \frac{1}{P_{rsvp\_RX}},$$

the subframe $t_y^{SL}$ is the first subframe of the subframe n belonging to Y, otherwise, Q=1.

6) If the number of the candidate single subframe resources remaining in the set $S_A$ is less than 0.2·$M_{total}$, step 4) is repeated, and $Th_{a,b}$ is increased by 3 dB.

7) For the candidate single subframe resources $R_{x,y}$ remaining in the set $S_A$, the measure standard $E_{x,y}$ is defined as a linear mean value that senses S-RSSI measured in the subchannel x+k in the subframe in step 2), representing as $t_{y-P_{step}*j}^{SL}$ for a non-negative integer j, where k=0, . . . , $L_{subCH}$−1.

8) The terminal device moves the candidate single subframe resource $R_{x,y}$ with minimum metric $E_{x,y}$ from the set $S_A$ to $S_B$. This step is repeated, until the number of the candidate single subframe resources in the set $S_B$ is greater than or equal to 0.2·$M_{total}$.

9) When the terminal device is configured by the high layer to use resource pools on a plurality of carriers for transmission, if the terminal device does not support the transmission of the candidate single subframe resources in the carriers, the candidate single subframe resources $R_{x,y}$ are excluded from the set $S_B$. Due to limitation of the number of the carriers simultaneously transmitted, the limitation of supported carrier combinations, or the interruption [10] of RF retuning time, the selected resources are used in other carriers for transmission.

The terminal device reports the set $S_B$ to the high layer.

NR-V2X supports a periodic service and a non-periodic service. In the related art, the complete sensing based resource selection method is discussed. Similar to the complete sensing based resource selection method in LTE-V2X, a specific sensing process and a resource selection process are illustrated as follows (referring to 3GPP R1-1913643).

In mode 2 of resource allocation, the high layer may request the terminal device to determine a subset of resources. Then, the high layer selects a resource for PSSCH/PSCCH transmission from the resources. In order to trigger this process, in a slot n, the high layer provides the following parameters for PSSCH/PSCCH transmission.

A resource pool reporting the resources.

L1 priority, $prio_{TX}$.

Remaining PDB.

The number $L_{subCH}$ of subchannels for PSSCH/PSCCH transmission in the slot.

Optionally, a resource reservation interval $P_{rsvp\_TX}$, in ms.

The following high layer parameters may affect this process.

t2min_SelectionWindow: an interval parameter $T_{2min}$, for a given value $prio_{TX}$, a corresponding value of a higher layer parameter t2min_SelectionWindow is set.

SL-ThresRSRP_pi_pj: This higher layer parameter provides an RSRP threshold value for each combination ($p_i$, $p_j$), where pi is a value of the priority field in a received SCI format 0-1, and pj is the priority of the terminal device to select resources for transmission. For the given invoking of this process, $p_j$=$prio_{TX}$.

RSforSensing is measured by selecting PSSCH-RSRP or PSCCH-RSRP defined in Section 8.4.2.1 used by the terminal device.

reservationPeriodAllowed t0_SensingWindow: An internal parameter T0 is defined the number of slots corresponding to t0_SensingWindow ms.

If the resource reservation interval $P_{rsvp\_TX}$ is provided, millisecond units are converted into logical slot units, resulting in $P'_{rsvp\_TX}$.

It is to be noted that, ($t_0^{SL}$, $t_1^{SL}$, $t_2^{SL}$, . . . ) represents a set of slots that may belong to a sidechain resource pool.

The following steps are included.

1) A candidate single slot resource for transmitting $R_{x,y}$ is defined as a set of $L_{subCH}$ consecutive subchannels having a subchannel x+j in a slot $t_y^{SL}$, where j=0, . . . , $L_{subCH}$−1. The terminal device should assume that any set of $L_{subCH}$ consecutive subchannels included in a corresponding resource pool within a time interval [n+$T_1$, n+$T_2$] corresponds to the candidate single slot resource.

Under $0 \leq T_1 \leq T_{proc,1}$, the selection of $T_1$ depends on the implementation of the terminal device, where $T_{proc,1}$ is TBD.

If $T_{2min}$ is less than a remaining packet delay budget (in slots), $T_2$ depends on the implementation of the terminal device, and the premise is $T_{2min} \leq T_2 \leq$ the remaining packet budget (in slots); otherwise, $T_2$ is set to the remaining packet delay budget (in slots).

The total number of the candidate single slot resources is represented as $M_{total}$.

2) A sensing window is defined by a range of a slot [n-$T_0$, n-$T_{proc,0}$), where $T_0$ is defined above, and $T_{proc,0}$ is TBD. The terminal device should monitor slots that may belong to a sidechain resource pool in a sensing window, except for those slots in which transmission occurs by themselves. The terminal device should be based on decoded PSCCH and measured RSRP in these slots, and perform behaviors according to the following steps.

3) An internal parameter Th($p_i$) is set to a corresponding value from a high layer parameter SL-ThresRSRP_pi_pj, and $p_j$ equals a given value $prio_{TX}$ and each priority value $p_i$.

4) The set $S_A$ is initialized into a set of all the candidate single slot resources.

5) If all of the following conditions are met, the terminal device excludes the candidate single subframe resource $R_{x, y}$ from the set $S_A$.

At step 2), the subframe $t_m^{SL}$ is not sensed by the terminal device.

For any periodic value that is allowed by a higher layer parameter reservationPeriodAllowed and the assumed SCI format 0-1 received in the slot $t_m^{SL}$, a "resource reservation period" field is set to the periodic value and indicates that all of the subchannels of the resource pool in the slot need to meet a condition c in step 6).

6) If all of the following conditions are met, the terminal device excludes the candidate single subframe resource $R_{x, y}$ from the set $S_A$.

a The terminal device receive the SCI format 0-1 in the slot $t_m^{SL}$, and the "resource reservation period" field (if present) and the "priority" field in the received SCI format 0-1 indicate values $P_{rsvp\_RX}$ and $prio_{RX}$, according to Subclause [TBD] in [6, TS 38.213].

b RSRP measurement performed on the received SCI format 0-1 according to Section 8.4.2.1 is higher than Th($prio_{RX}$).

c For the SCI format received in the slot $t_m^{SL}$, or when and only when there is "resource reservation period" field in the received SCI format 0-1, it is assumed that, according to a clause [TBD] in [6, TS 38.213], a set of resource blocks and slots that overlap with $R_{x,y+j \times P'_{rsvp\_TX}}$ is determined at the slot $t_{m+q \times P'_{rsvp\_RX}}^{SL}$, where q=1, 2, ..., Q and j=0, 1, ..., $C_{resel}$−1. Herein, $P'_{rsvp\_RX}$ is $P_{rsvp\_RX}$ that is converted into the logical slot units. If $P_{rsvp\_RX} < T_{scal}$ and n'−m≤$P'_{rsvp\_RX}$, and if the slot n belongs to the set ($t_0^{SL}$, $t_1^{SL}$, ..., $t_{T_{max}}^{SL}$), $t_{n'}^{SL}$=n, otherwise, the slot $t_{n'}^{SL}$ is the first slot after the slot n belong to the set ($t_0^{SL}$, $t_1^{SL}$, ..., $t_{T_{max}}^{SL}$); otherwise, Q=1. $T_{scal}$ is FFS.

7) If the number of the candidate single subframe resources remaining in the set $S_A$ is less than 0.2·$M_{total}$, Th($p_i$) is increased by 3 dB, and step 4) is repeated.

The terminal device reports the set $S_A$ to the high layer.

It is to be understood that, terms "system" and "network" in the disclosure may usually be exchanged in the disclosure. The term "and/or" in the specification is merely an association relationship describing related objects, which means that there may be three relationships, for example, A and/or B may indicate three cases: A exists alone, A and B exist simultaneously, and B exists alone. In addition, the character "/" in this paper generally indicates that the related objects are in an "or" relationship.

In order to understand the features and technical contents of the embodiments of the present invention in more detail, the implementation of the embodiments of the present invention are described in detail below with reference to the drawings, which are for reference only and are not intended to limit the embodiments of the present invention.

An embodiment of the present invention provides a resource selection method. As illustrated in FIG. 2, the method includes the following operations.

At block 21, a first terminal device performs resource selection at time n, and determines a transmission resource for transmitting sidelink data according to a sensing result.

The sensing result includes at least one of the following:
a sensing result that is obtained by the first terminal device performing sensing on at least one time unit after the time n; and
a sensing result that is obtained by the first terminal device performing sensing on at least one time unit before the time n.

In this embodiment, the first terminal device may be a terminal device in a V2X scenario.

The foregoing time n may be:
a time when sidelink data to be transmitted arrives, for example, a time when the sidelink data to be transmitted arrives a Media Access Control (MAC) layer of the terminal. Alternatively, the time n is the time when the high layer of the first terminal device acquires an available resource set. Alternatively, the time n is the time when the high layer of the first terminal device triggers performing resource selection.

A scenario that this embodiment is mainly aimed at may be the processing of partial sensing in NR-V2X, or may be applied to the processing of performing sensing and resource selection in a resource pool not only supporting a periodic service but also supporting a non-periodic service, or may further be the processing of performing resource selection by performing partial sensing on the non-periodic service of LTE-V2X. Definitely, this embodiment may further be applied to more other scenarios, as long as the terminal device in Internet of vehicles needs to perform partial sensing for resource selection, which is not described herein again.

NR-V2X supports the periodic service and the non-periodic service. For the periodic service, when the terminal selects a transmission resource, a resource may be reserved for transmitting next sidelink data. Whether the terminal is supported to reserve the transmission resource for the next sidelink data is generally configurable. By using a parameter "reserveResourceDifferentTB" for expression, when the parameter is a first value (for example, "enable"), it indicates that the terminal may reserves the transmission resource for the next sidelink data. When the parameter is a second value (for example, "disable"), it indicates that the terminal cannot reserve the transmission resource for the next sidelink data.

A period of the resource that the terminal device may reserve is configured by using a parameter "reservationPeriodAllowed". The value of the parameter, for example, is all or part of a set {0, 20, 50, 100, 200, 300, 400, 500, 600, 700, 800, 900, 1000} ms.

Figure 3:
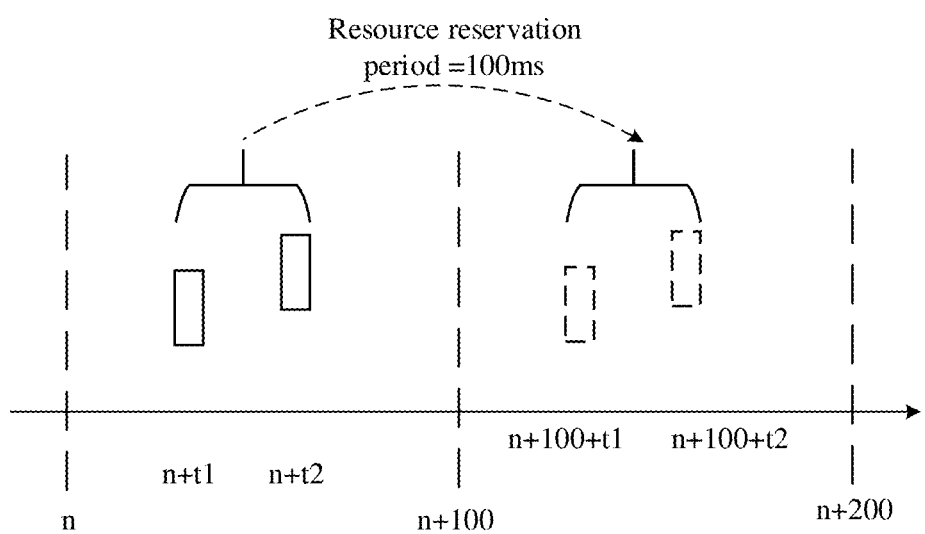
FIG. 3 is a schematic diagram of scenarios corresponding to a plurality of examples according to an embodiment of the present application.

As illustrated in FIG. 3, the terminal device selects two resources at time n, and the two resources are respectively located at n+t1 and n+t2. The two transmission resources are configured to transmit first sidelink data (including first transmission and retransmission). In the resource pool, the terminal is allowed to reserve the transmission resources for the next sidelink data. That is to say, the value of the parameter reserveResourceDifferentTB is enable, and a service period of the terminal is 100 ms. In this way, the terminal carries indication information in SCI, for example, the indication information is a resource reservation period. If the indication information indicates 100 ms, that is, it indicates that the terminal reserves two resources after 100 ms, that is, n+100+t1 and n+100+t2. The two transmission resources are configured to transmit second sidelink data (including first transmission and retransmission). When new sidelink data arrives at the terminal, resources of n+100+t1 and n+100+t2 may be used for transmission.

Therefore, the terminal selects N transmission resources. A first information domain in SCI is used to indicate time-frequency information of N transmission resources, a second information domain (a resource reservation period) in SCI is used to indicate the reservation of N transmission resources of a next period, and the N transmission resources of the next period are configured to transmit different sidelink data.

Correspondingly, when another terminal (such as the first terminal device) performs sensing, that the terminal selects transmission resources at time n+t1 and n+t2 may be determined according to SCI transmitted by the terminal. That the terminal reserves two transmission resources of n+100+t1 and n+100+t2 may be learned according to the indication information in SCI. In this way, another terminal may determine whether the resources reserved by the terminal need to be excluded according to the above principles of sensing and resource selection, so that resource conflict between the terminals is avoided.

When the terminal cannot reserve the transmission resource for the next sidelink data, the terminal selects the resources at two time n+t1 and n+t2, which cannot reserve transmission resource for the next sidelink data. When new sidelink data arrives at the terminal, the terminal needs to reselect a resource for the sidelink data. In this case, for a user only supporting partial sensing, the terminal may perform resource selection according to a result of partial sensing.

It is to be noted that, whether the terminal device adopts partial sensing or complete sensing may be configured by the high layer. In a case that partial sensing is configured, resource selection is performed by adopting the result of partial sensing. Alternatively, for certain terminal device types, for example, a terminal device only supporting partial sensing, or a terminal device not only supporting partial sensing but also supporting complete sensing. Partial sensing may also be performed, and resource selection may be performed according to the sensing result.

The solution provided in this embodiment mainly describes the processing of performing partial sensing and resource selection. Details may be described in detail with reference to the following examples.

Example 1: a sensing result is obtained by the first terminal device performing sensing on at least one time unit after the time n. Specifically, when data arrives at the terminal, the terminal senses A time units, and performs resource selection according to sensing results of the A time units. This example mainly applied to a non-periodic service scenario.

Specifically, the first terminal device performs sensing on a first time unit set after the time n to obtain a first sensing result.

The first time unit set includes A time units, and A is a positive integer.

The foregoing time units may be slots or subframes. That is to say, the first terminal device selects a first slot set after the time n, or performs sensing on a first subframe set to obtain the first sensing result. The first time unit set may include A slots or A subframes.

Correspondingly, the operation that the first terminal device determines the transmission resource for transmitting the sidelink data according to the sensing result includes the following operation.

The first terminal device determines, according to the first sensing result, the transmission resource from a second time unit set. Time units in the second time unit set are located after time units in the first time unit set.

The resource reserved by a second terminal device may be determined according to the first sensing result. Specifically, the resource reserved by the second terminal device in the second time unit set may be determined. The second terminal device may be any one or more terminal devices except the first terminal device. That is to say, the second terminal device may be one or more second terminal devices.

Further, the number of time units included in the second time unit set may also be A. That is to say, the first time unit set may include A time units within time [n+1, n+A], and the second time unit set may include A time units within time [n+A+1, n+2A].

The foregoing operation of determining the transmission resource from the second time unit set according to the first sensing result may include: after the resource reserved by the second terminal device determined according to the first sensing result is excluded from the second time unit set, determining a candidate resource set from the second time unit set, and randomly selecting one or more time units from the candidate resource set as a transmission resource of the first terminal device for sidelink data transmission.

A manner for determining A is one of the following.

A is determined according to a time interval of the transmission resources that can be indicated according to SCI.

Alternatively, A is determined according to a time delay requirement of a service corresponding to the sidelink data.

Alternatively, A is determined according to a service priority corresponding to the sidelink data.

Alternatively, A is determined according to a configuration parameter of a resource pool.

Alternatively, A is determined according to network device configuration information.

Specifically, A is a positive integer. Preferably, A is determined according to the time interval of the transmission resources that can be indicated by the terminal.

For example, a first terminal indicates time-frequency information of the transmission resource through SCI. The SCI of the terminal may indicate N_max transmission resources, and N_max may be configured as 2 or 3. When N_max=2, the SCI may indicate up to 2 transmission resources. When N_max=3 he SCI may indicate up to 3 transmission resources. However, whether N_max equals to 2 or 3, a maximum time interval between the first transmission resource and the last transmission resource is 31 slots. Therefore, preferably, A=31.

Optionally, the terminal determines the number A of the sensed slots according to the time delay requirement of the service corresponding to the sidelink data.

For example, if the time delay requirement of the sidelink data is greater than W (for example, W=31) slots, the terminal may sense A=W slots. If the time delay requirement of the sidelink data is less than W slots, the terminal may sense A(<W) slots. The A slots are determined according to the time delay requirement of the terminal, for example, the time delay requirement of the terminal is 10 ms, A=10.

Optionally, A may be a parameter determined according to the priority. For example, the higher the priority of the sidelink data, the larger (or smaller) the A value, and the lower the priority, the smaller (or larger) the A value.

Herein, a correspondence between the service priority corresponding to the sidelink data and the A value may be configured through a network, or preset, for example, determined according to an arrangement.

This example is especially applicable to the non-periodic service. In the non-periodic service, the terminal cannot reserve the resource for the next sidelink data, but can only reserve a transmission resource for a current sidelink data, that is, the transmission resource indicated by an indication information in the SCI. A maximum time domain range is W (W=31) slots, that is, the SCI at the slot n, of which maximum time domain position of the indicated transmission resource is a slot n+31. When data arrives at the terminal, by sensing A (preferably, A=W) slots, a resource reserved by another user may be learned. Therefore, resource selection may be performed according to sensing results of the A slots, that is, resource selection may be performed based on partial sensing.

Figure 4:
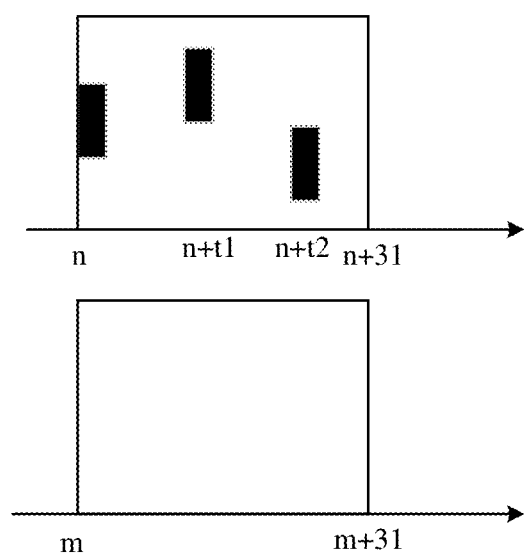
FIG. 4 is a schematic diagram of scenarios corresponding to a plurality of examples according to an embodiment of the present application.

Referring to FIG. 4, in this example, for example, the SCI transmitted by UE 2 (for example, the second terminal device) at the time n indicates 3 transmission resources, which respectively are n, n+t1, and n+t2, and the 3 transmission resources are all in a time window of [n, n+31]. When data arrives at UE 1 (for example, the first terminal device) at the time n, the UE 1 may sense A=31 slots. Therefore, the transmission resource reserved by another user, such as the second terminal device, may be learned. Herein, the transmission resource reserved by another user (the second terminal device) is only a resource for sidelink data transmission indicated through SCI, rather than the reserved transmission resource for the next sidelink data.

The UE1 (the first terminal device) starts sensing 31 slots at a time m to obtain a first sensing result, so that a resource reservation situation of another terminal within a slot [m+32, m+62] range (that is, within the second time unit set) may be acquired. Therefore, resource selection may be performed in the second time unit set according to the first sensing result. As illustrated in the figure, reserved resources of the second terminal devices n, n+t1, and n+t2 are obtained through sensing. Then, within the slot [m+32, m+62], the first terminal device selects a resource from the remaining time units for transmission of sidelink data required to be transmitted after excluding the foregoing reserved resources.

It is to be understood that, in this embodiment, a range of the first time unit set and a range of the second time unit set are only exemplarily described. The processing capability of the terminal needs to be considered when the terminal selects the range of the first time unit set and the range of the second time unit set. For example, the processing capability of the terminal corresponds to K slots, and then a starting position of the second time unit set should be k slots after an ending position of the first time unit set.

Example 2: a sensing result is obtained by the first terminal device performing sensing on at least one time unit after the time n. A difference between this example and Example 1 lies in that, the solution provided in this example is that, when data arrives at the terminal, the terminal selects a resource within the resource selection window, and performs sensing before the resource is used to transmit the sidelink data.

That is to say, in the second example, resource selection is first performed, sensing is next performed, and then whether the resource is reselected is determined according to the sensing result.

Specifically, the first terminal device selects a first transmission resource from the resource selection window. A starting position of the resource selection window is determined according to processing capability of the first terminal device, and an ending position of the resource selection window is determined according to a Package Delay Budget (PDB) of a service corresponding to the sidelink data.

A manner of selecting the first transmission resource within the resource selection window may include randomly selecting, by the first terminal device, the first transmission resource within the resource selection window.

In addition, the number of the selected resources may be determined according to an actual requirement, which is not described herein again.

The first terminal device performs sensing before a time corresponding to the first transmission resource, to obtain a second sensing result.

The starting time of the resource selection window may be the time n, alternatively, the starting time or the starting position may be set to n+x according to the processing capability of the first terminal device, and x may be the time unit greater than or equal to 1, for example, x=1. Then, the starting position of the resource selection window is n+1. The x may be determined according to time delay brought by the service processing capability of the terminal.

In addition, the ending position (or an ending time) of the resource selection window may be determined according to service time delay, for example, may specifically be determined by PDB. The PDB is 50 slots, and then the ending position of the resource selection window is required to be less than 50.

Figure 5:
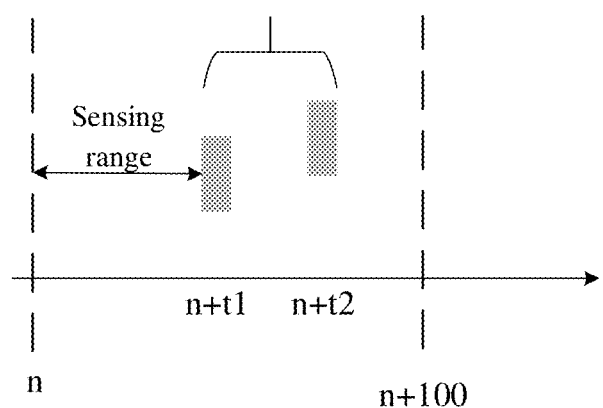
FIG. 5 is a schematic diagram of scenarios corresponding to a plurality of examples according to an embodiment of the present application.
Figure 6:
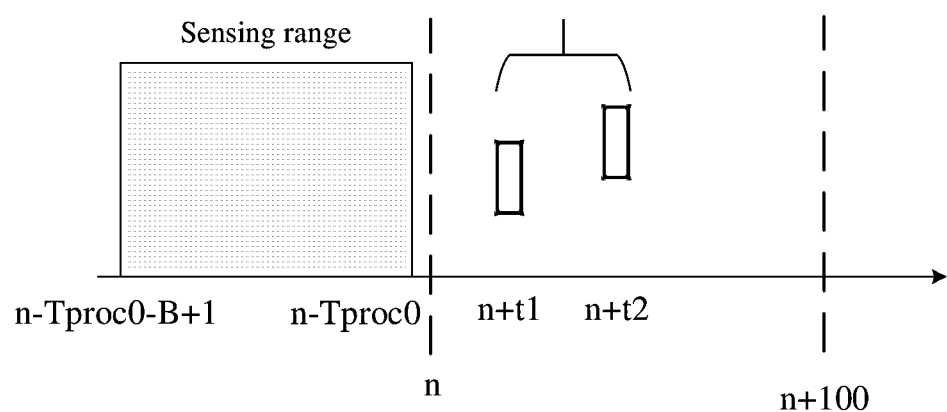
FIG. 6 is a schematic diagram of scenarios corresponding to a plurality of examples according to an embodiment of the present application.

For example, an example is illustrated in FIG. 5, data arrives at the time n, and the first terminal device needs to perform resource selection. For example, a range of the resource selection window is [n+1, n+100], two transmission resources are randomly selected from the resource selection window to transmit the sidelink data, which are respectively located at n+t1 and n+t2. Before a time n+t1, that is, before the resources is used to transmit the sidelink data, the terminal performs resource sensing.

The first terminal device performs sensing before a time corresponding to the first transmission resource, to obtain a second sensing result.

There may be one or more first transmission resources. The processing for each first transmission resource may adopt a same manner. Therefore, in this example, one of the first transmission resources is described, and the processing for other selected first transmission resources is the same, which is not described again.

According to the second sensing result, the terminal device may determine whether a reserved resource of the second terminal device is sensed to conflict with the first transmission resource from the start of the resource selection window to the time of the first transmission resource.

Further, the operation of determining, according to the sensing result, the transmission resource for transmitting the sidelink data includes the following operation.

When the first transmission resource is determined to not conflict with a transmission resource for a second terminal device according to the second sensing result, the first transmission resource is determined as the transmission resource for transmitting the sidelink data.

And/or, the method further includes: when the first transmission resource is determined to conflict with a second transmission resource for the second terminal device according to the second sensing result, reselecting the transmission resource.

A manner of determining, according to the second sensing result, whether the first transmission resource conflicts with the transmission resource of the second terminal device may be that, when the second sensing result indicates that, during sensing, there is a reserved resource of the second terminal device at a time-frequency position corresponding to the first transmission resource is detected, it is considered that there is a conflict, otherwise there is no conflict.

If there is a conflict, the re-selection of the transmission resource may be directly performed to obtain a new first transmission resource. Likewise, for the new first transmission resource, the foregoing processing may also be repeatedly performed. Sensing is performed in the resource selection window to obtain a new second sensing result, and then determination is performed. Details are not described again.

In addition to the processing of directly reselecting the transmission resource, the processing of reselecting the transmission resource when the first transmission resource is determined to conflict with the second transmission resource for the second terminal device according to the second sensing result may further include the following processing method.

If the first transmission resource is determined to conflict with the second transmission resource of the second terminal device according to the second sensing result and a preset condition is met, the transmission resource is reselected.

The preset condition includes at least one of the following.

A service priority corresponding to the sidelink data is lower than a service priority corresponding to the sidelink data carried in the second transmission resource.

Reference Signal Receiving Power (RSRP) measured by the first terminal device measures for the second terminal device is higher than a preset threshold value.

That is to say, the first terminal device may learn whether the selected transmission resource conflicts with a transmission resource of another terminal by performing sensing before the time (such as n+t1) corresponding to the first transmission resource, if so, measures may be adopted to avoid conflict.

Specifically, a manner may perform determination based on the service priority. For example, when the first terminal device determines, according to sensing, there is a resource conflict, whether resource re-selection is required is determined according to service priority P1 corresponding to current sidelink data to be transmitted and service priority P2 corresponding to sensed sidelink data of another terminal.

If the priority of the sidelink data of another terminal (that is, the second terminal device) is higher than the priority of the sidelink data of the first terminal device, that is, P2<P1 (a lower priority value indicates higher priority). Then, the first terminal device needs to perform resource re-selection, to as to avoid interference to high priority sidelink transmission. If the priority of the sidelink data of another terminal (that is, the second terminal device) is not higher than the priority of the sidelink data of the terminal, that is, P2≥P1. Then, the first terminal device does not need to perform resource re-selection.

In another manner, the first terminal device may determine whether resource re-selection is required according to the combination of the priority of the sidelink data and the measure RSRP. For example, P2<P1, and the RSRP of the second terminal device measured by the first terminal device is higher than a threshold, the first terminal device performs resource re-selection, otherwise resource re-selection is not performed.

In still another manner, the first terminal device may determine whether resource re-selection is required according to the measure RSRP. For example, the RSRP of the second terminal device measured by the first terminal device is higher than the threshold, the first terminal device performs resource re-selection, and otherwise resource re-selection is not performed.

The solution provided in this example is particularly applicable to a scenario of non-periodic services. When data arrives, the first terminal device randomly selects the transmission resource, performs resource sensing before the transmission resource is used, determines whether a resource conflict occurs according to the sensing result, and determines whether resource re-selection is required. Therefore, through partial sensing, the resource conflict with another second terminal device is realized.

Example 3: a sensing result is obtained by the first terminal device performing sensing on at least one time unit before the time n. When data arrives at the first terminal device at the time n, the first terminal device senses B time units, and performs resource selection according to sensing results of the B time units. A difference between this example and Examples 1 and 2 lies in that, in this example, the sensed B time units are B time units before the time n when the data arrives.

The first terminal device performs sensing on a third time unit set before the time n to obtain a third sensing result.

The third time unit set includes B time units, and B is an integer greater than or equal to 1.

The expression that the third time unit set includes B time units includes the following content.

The B time units are B consecutive time units before the time n.

Herein, the B time units may be B consecutive slots or B consecutive subframes.

A manner for determining B is one of the following.

B is determined according to a time interval of the transmission resources that can be indicated according to SCI.

Alternatively, B is determined according to a time delay requirement of a service corresponding to the sidelink data.

Alternatively, B is determined according to a service priority corresponding to the sidelink data.

Alternatively, B is determined according to a configuration parameter of a resource pool.

Alternatively, B is determined according to network device configuration information.

The description of the method for determining B is the same as the specific description of the method for determining A in the foregoing example A, which is not described herein again.

The operation of determining, according to the sensing result, the transmission resource for transmitting the sidelink data includes: according to the third sensing result, determining, by the first terminal device, the transmission resource for transmitting the sidelink data.

Specifically, by using the B time units being B slots as an example, when data arrives at the time n, the first terminal device performs resource selection according to the third sensing results of the B time units. Optionally, a sensing range of the B slots is [n−Tproc0−B+1, n−Tproc0], and a parameter Tproc0 is a pre-configured parameter or a parameter configured by a network, or a parameter (which may specifically be determined according to processing time delay) determined according to the capacity of the terminal.

Preferably, similar to Example 1, B=31, that is, the terminal senses 31 slots, corresponding to a maximum time range of the transmission resource that is used for transmitting the sidelink data and can be indicated by the SCI.

According to the third sensing result, the reserved resource of the second terminal device may be determined. The reserved resource may be characterized by a time-frequency resource.

In addition, the first terminal device determines, according to the third sensing result, the transmission resource for transmitting the sidelink data. The determination operation may be performed within a certain resource selection window, for example, may be performed within a time [n+1, n+100]. The determination of the start and the ending of the resource selection window may be the same as that of Example 2, which is not described herein again.

When the transmission resource is selected, after the reserved resource of another second terminal device determined according to the third sensing result is excluded, one or more transmission resource may be randomly used as the transmission resources used for transmitting the sidelink data It is to be noted that, since it is required to learn, in advance, that there is data arriving at the time n, this example is more applicable to the periodic service scenarios. That is to say, the first terminal device needs to estimate or predict that there is data arriving at the time n, and then performs sensing in a time unit set composed of B consecutive time units before the time n.

Definitely, this example may alternatively be used in a non-periodic scenario. In the non-periodic scenario, if the solution of this example is used, sensing may be maintained in advance. However, when data arrives at the time n, only the sensing results corresponding to the B consecutive time units before the time n are used as the third sensing result for follow-up processing. In other words, the first terminal device may keep sensing, but only reserve the third sensing result for the B consecutive time units before the current time, and other sensing results may be deleted.

Further, this example may be combined with the foregoing examples. For example, the first terminal device may estimate that sidelink data arrives at the time n, so that sensing of the B time units is performed before the time n to obtain the third sensing result. According to the third sensing result, one or more transmission resources are selected in the resource selection window.

Then, before one or more transmission resources arrive, sensing is still maintained. That is to say, by combining Example 2, one or more transmission resources may be used as the first transmission resource to obtain the second sensing result before the time of the first transmission resource arrives. Then, whether there is a conflict in the first transmission resource is determined, if no, the first transmission resource is adopted to transmit the sidelink data, otherwise, Example 2 is repeatedly performed for resource re-selection.

Example 4: a sensing result is obtained by the first terminal device performing sensing on at least one time unit before the time n. For a case for supporting periodic reservation transmission resources, the terminal performs partial sensing according to a configuration parameter.

Specifically, the first terminal device determines at least one transmission period within a sensing range before the time n according to a sensing configuration parameter, and determines Y time units need to be sensed in each of the at least one transmission period, where Y is an integer greater than or equal to 1.

The first terminal device performs sensing on the Y time units in the at least one transmission period to obtain a fourth sensing result.

The sensing configuration parameter includes at least one of the following:
a sensing time unit, a sensing proportion, or the number of sensing time units.

Likewise, the time units in this example may alternatively be slots or subframes.

The sensing range may be understood as a sensing window, and a length of the sensing window may be set by considering a possible service period of the first terminal device. The possible service period may be configured according to a "reservationPeriodAllowed" parameter in the configuration parameter.

In addition, in the processing of setting the sensing window according to the service period, considering that the possible service period of the first terminal device is {100, 200, 300, . . . , 1000}, a network may configure a subset of the service periods included in the parameter. For example, an allowed period in a system is {100, 500, 1000}, the first terminal device only needs to sense Y time units (subframes or slots) corresponding to these periods.

The operation that the first terminal device determines the transmission resource for transmitting the sidelink data according to the sensing result includes the following operation.

According to the fourth sensing result, the transmission resource for transmitting the sidelink data is determined from Y time units within the resource selection window.

For example, the resource reserved by the second terminal device is determined according to the fourth sensing result. Then, when resource selection is performed in the resource selection window, one or more transmission resources used for transmitting the sidelink data may be selected after the resources reserved by the second terminal device are excluded.

Figure 7:
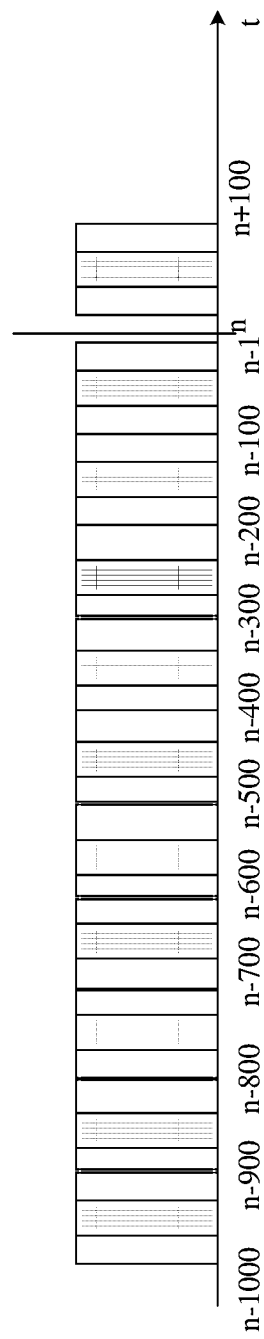
FIG. 7 is a schematic diagram of scenarios corresponding to a plurality of examples according to an embodiment of the present application.

As illustrated in FIG. 7, there is data arriving at the first terminal device at the time n, resource selection is required, the resource selection window is [n+1, n+100] (for the determination of the starting and ending position of the resource selection window, refer to the description of the foregoing examples, which is not described herein again), the sensing window is [n−1000, n−1], and the supported period is {100, 200, 300, 400, 500, 600, 700, 800, 900, 1000} ms.

Then, for partial sensing, a network configuration terminal needs to sense Y=10 subframes, that is, the resources accounting for 10% of the resource selection window. The first terminal device selects Y subframes in the resource selection window. As illustrated in a gray box in the figure, in order to learn the situation of the resources reserved on the Y subframes, the first terminal device needs to sense the Y subframes at corresponding positions in each possible period in the sensing window, that is, sidelink transmission on the Y subframes are respectively sensed in ten possible periods of [n−100, n−1], [n−200, n−101] . . . , to obtain the fourth sensing result, so that available resources on the Y subframes in the resource selection window are determined.

This example is particularly applicable to a scenario of periodic services. For terminals only having the capacity of partial sensing, the terminals may select candidate transmission resources from the resource selection window for transmission according to results of partial sensing, so as to avoid interference and transmission conflicts among the terminals.

It is to be noted that, at least two examples in Example 1, Example 2, Example 3, and Example 4 may be combined. The combination of Example 3 has been provided above, and is not described herein again. The solution provided in Example 4 may be processed by combining Example 1 or Example 2. For example, in NR-V2X, the periodic services and the non-periodic services may use the same resource pool. That is to say, in the resource pool, not only the periodic services (the terminal may reserve the transmission resource for the next sidelink data) may be transmitted, but also the non-periodic services (the terminal can only select and reserve the transmission resource for the current sidelink data) may be transmitted. In this case, Example 4 and Example 1, or Example 4 and Example 2, may be combined.

In the combination of Example 1 and Example 4, the operation that the first terminal device determines the transmission resource for transmitting the sidelink data according to the sensing result includes the following operation.

According to the first sensing result and the fourth sensing result, the transmission resource for transmitting the sidelink data is determined from Y time units within the resource selection window.

For example, the first terminal device performs resource sensing in each possible reservation period according to the configuration parameter Y of partial sensing to obtain the fourth sensing result (that is, the reserved resource of the second terminal device in Y time units (subframes or slots, the slots are used below for description) in the resource selection window). When data arrives at the time n, the first terminal device continuously performs sensing in A time units (subframes or slots) starting at the time n, to obtain the first sensing result.

The first terminal device determines an available resource set in Y slots in the resource selection window according to the fourth sensing result and the first sensing result of the sensed A slots after the time n, and randomly selects the transmission resources to transmit the sidelink data.

In this way, according to the results of partial sensing in the sensing window, a resource conflict between the terminal and the terminal of the periodic reservation transmission resource may be avoided. According to the sensing results of A time units after the time n, a resource conflict between the terminal and a non-periodically reserved terminal may be realized.

In this solution, whether two sensing may be combined may alternatively be determined, which may include: determining whether time intervals of Y time units in the resource selection window relative to the time n are greater than a preset time interval. If so, the two sensing cannot be combined, otherwise, the two sensing can be combined. The preset time interval may be PDB of the first terminal device.

For example, by using the time unit being the slot as an example, if the time intervals of Y slots in the resource selection window relative to the time n are greater than the PDB of the first terminal device, the first terminal device only performs resource selection according to the first sensing result of A slots.

For example, the PDB of the first terminal device is 50 slots. Y slots are 10 slots between [n+61, n+70], which are all greater than the PDB. Therefore, the first terminal device cannot select the transmission resources of the Y slots, and can only perform resource selection according to the sensing result of A=31 slots starting at time n. For example, the terminal senses the slot [n+1, n+31], and performs resource selection within the slot [n+32, n+50] according to the sensing result.

In the combination of Example 2 and Example 4, the operation that the first terminal device determines the transmission resource for transmitting the sidelink data according to the sensing result includes the following operation.

According to the second sensing result and the fourth sensing result, the transmission resource for transmitting the sidelink data is determined from Y time units within the resource selection window.

That is to say, the first terminal device performs resource selection in each possible reservation period according to the configuration parameter Y of partial sensing, to obtain the fourth sensing result.

When data arrives at the time n, the first terminal device determines the available resource set in Y slots in the resource selection window according to the results of partial sensing, and randomly selects the candidate transmission resource in the available resource set. Before the first terminal device uses the candidate transmission resource, the terminal continuously performs sensing to obtain the second sensing result, and determines whether there is a conflict between the candidate transmission resource and the transmission resource reserved by the terminal of the non-periodic service. If so, a resource is reselected, otherwise, the candidate resource is used as the first transmission resource to transmit the sidelink data. The manner of reselecting the resource has been described in detail in the foregoing examples, which is not described herein again.

It is to be learned that, through the above solution, partial sensing can be performed at partial slots before or after the time n for resource selection, and the transmission resource of the sidelink data is selected according to the sensing result. Therefore, through partial sensing, the resource conflict with another second terminal device of the periodic reservation transmission resource or the non-periodic reservation transmission resource may be avoided, so that transmission reliability is enhanced.

Figure 8:
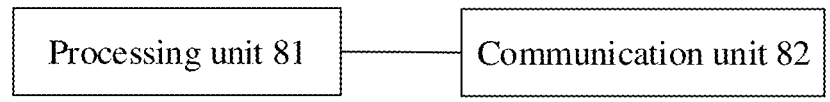
FIG. 8 is a schematic diagram of a composition structure of a terminal device according to an embodiment of the present application.

An embodiment of the present invention provides a terminal device. As illustrated in FIG. 8, the terminal device includes a processing unit.

The processing unit 81 is configured to perform resource selection at time n, and determine a transmission resource for transmitting sidelink data according to a sensing result.

The sensing result includes at least one of the following:
  a sensing result that is obtained by the first terminal device performing sensing on at least one time unit after the time n; and
  a sensing result that is obtained by the first terminal device performing sensing on at least one time unit before the time n.

In this embodiment, the first terminal device may be a terminal device in a V2X scenario.

The foregoing time n is a time when data arrives. Alternatively, the time n is the time when a high layer of the terminal device acquires an available resource set. Alternatively, the time n is the time when the high layer of the terminal device triggers performing the terminal device for resource selection.

The solution provided in this embodiment mainly describes the processing of performing partial sensing and resource selection. Details may be described in detail with reference to the following examples.

Example 1: a sensing result is obtained by performing sensing on at least one time unit after the time n. Specifically, when data arrives at the terminal, A time units are sensed, and resource selection is performed according to sensing results of the A time units. This example mainly applied to a non-periodic service scenario.

The terminal device further includes a communication unit.

The communication unit 82 is configured to perform sensing on a first time unit set after the time n to obtain a first sensing result.

The first time unit set includes A time units, and A is a positive integer.

The foregoing time units may be slots or subframes. That is to say, the first terminal device selects a first slot set after the time n, or performs sensing on a first subframe set to obtain the first sensing result. The first time unit set may include A slots or A subframes.

Correspondingly, the processing unit 81 determines, according to the first sensing result, the transmission resource from a second time unit set. Time units in the second time unit set are located after time units in the first time unit set.

Specifically, the processing unit 81 determines, according to the first sensing result, a resource reserved by a second terminal device. Specifically, the resource reserved by the second terminal device in the second time unit set may be determined. The second terminal device may be any one or more terminal devices except the terminal device. That is to say, the second terminal device may be one or more second terminal devices.

A manner for determining A is one of the following.

A is determined according to a time interval of the transmission resources that can be indicated according to SCI.

Alternatively, A is determined according to a time delay requirement of a service corresponding to the sidelink data.

Alternatively, A is determined according to a service priority corresponding to the sidelink data.

Alternatively, A is determined according to a configuration parameter of a resource pool.

Alternatively, A is determined according to network device configuration information.

Example 2: a sensing result is obtained by performing sensing on at least one time unit after the time n. A difference between this example and Example 1 lies in that, the solution provided in this example is that, when data arrives at the terminal, the terminal selects a resource from the resource selection window, and performs sensing before the resource is used to transmit the sidelink data.

That is to say, in this example, resource selection is first performed, sensing is next performed, and then whether the resource is reselected is determined according to the sensing result.

Specifically, the processing unit selects a first transmission resource from the resource selection window. A starting position of the resource selection window is determined according to processing capability of the first terminal device, and an ending position of the resource selection window is determined according to a Package Delay Budget (PDB) of a service corresponding to the sidelink data.

The communication unit is configured to perform sensing before a time corresponding to the first transmission resource, to obtain a second sensing result.

Further, the processing unit is configured to, when the first transmission resource is determined to not conflict with a transmission resource of a second terminal device according to the second sensing result, determine the first transmission resource as the transmission resource for transmitting the sidelink data.

And/or, the processing unit is configured to, when the first transmission resource is determined to conflict with a second transmission resource of the second terminal device according to the second sensing result, reselect the transmission resource.

A manner of determining, according to the second sensing result, whether the first transmission resource conflicts with the transmission resource of the second terminal device may be that, when the second sensing result indicates that, during sensing, there is a reserved resource of the second terminal device at a time-frequency position corresponding to the first transmission resource is detected, the processing unit considers that there is a conflict, otherwise there is no conflict.

In addition to the processing of directly reselecting the transmission resource, the processing of reselecting the transmission resource if the first transmission resource is determined to conflict with the second transmission resource of the second terminal device according to the second sensing result may further include: reselecting, by the processing unit, the transmission resource if the first transmission resource is determined to conflict with the second transmission resource of the second terminal device according to the second sensing result and a preset condition is met.

The preset condition includes at least one of the following.

A service priority corresponding to the sidelink data is lower than a service priority corresponding to the sidelink data carried in the second transmission resource.

The measured Reference Signal Receiving Power (RSRP) for the second terminal device is higher than a preset threshold value.

Example 3: a sensing result is obtained by performing sensing on at least one time unit before the time n. When data arrives at the terminal device at the time n, the terminal senses B time units, and performs resource selection according to sensing results of the B time units. A difference between this example and Example 1 and Example 2 lies in that, in this example, the sense B time units are B time units before the time n when the data arrives.

The communication unit is configured to perform sensing on a third time unit set before the time n to obtain a third sensing result.

The third time unit set includes B time units, and B is an integer greater than or equal to 1.

The expression that the third time unit set includes B time units includes the following content.

The B time units are B consecutive time units before the time n.

Herein, the B time units may be B consecutive slots or B consecutive subframes.

A manner for determining B is one of the following.

B is determined according to a time interval of the transmission resources that can be indicated according to SCI.

Alternatively, B is determined according to a time delay requirement of a service corresponding to the sidelink data.

Alternatively, B is determined according to a service priority corresponding to the sidelink data.

Alternatively, B is determined according to a configuration parameter of a resource pool.

Alternatively, B is determined according to network device configuration information.

The processing unit determines, according to the third sensing result, the transmission resource for transmitting the sidelink data.

Example 4: a sensing result is obtained by the terminal device performing sensing on at least one time unit before the time n. For a case for supporting periodic reservation transmission resources, the terminal performs partial sensing according to a configuration parameter.

Specifically, the processing unit, configured to determine at least one transmission period within a sensing range before the time n according to a sensing configuration parameter, and determine Y time units need to be sensed in each of the at least one transmission period, wherein Y is an integer greater than or equal to 1.

The communication unit performs sensing on the Y time units in the at least one transmission period to obtain a fourth sensing result.

The sensing configuration parameter includes at least one of the following:

a sensing time unit, a sensing proportion, or the number of sensing time units.

The processing unit determines, according to the fourth sensing result, the transmission resource for transmitting the sidelink data from Y time units within the resource selection window.

It is to be noted that, at least two examples in Example 1, Example 2, Example 3, and Example 4 may be combined. The combination of Example 3 has been provided above, and is not described herein again. The solution provided in Example 4 may be processed by combining Example 1 or Example 2. For example, in NR-V2X, the periodic services and the non-periodic services may use the same resource pool. That is to say, in the resource pool, not only the periodic services (the terminal may reserve the transmission resource for the next sidelink data) may be transmitted, but also the non-periodic services (the terminal can only select and reserve the transmission resource for the current sidelink data) may be transmitted. In this case, Example 4 and Example 1, or Example 4 and Example 2, may be combined.

In the combination of Example 1 and Example 4, the processing unit determines, according to the first sensing result and the fourth sensing result, the transmission resource for transmitting the sidelink data in Y time units in the resource selection window.

In the combination of Example 2 and Example 4, the processing unit determines, according to the second sensing result and the fourth sensing result, the transmission resource for transmitting the sidelink data from Y time units within the resource selection window.

It is to be learned that, through the above solution, partial sensing can be performed at partial slots before or after the time n for resource selection, and the transmission resource of the sidelink data is selected according to the sensing result. Therefore, through partial sensing, the resource conflict with another second terminal device of the periodic reservation transmission resource or the non-periodic reservation transmission resource may be avoided, so that transmission reliability is enhanced.

Figure 9:
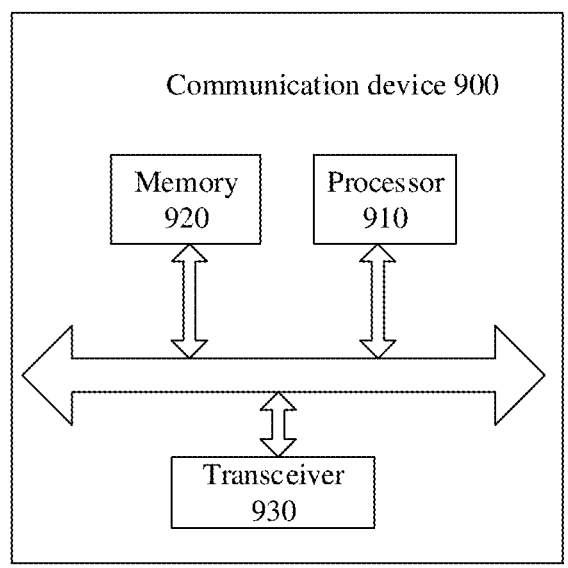
FIG. 9 is a schematic diagram of a composition structure of a communication device according to an embodiment of the present application.

FIG. 9 is a schematic diagram of a structure of a communication device 900 according to an embodiment of the present invention. The communication device in this embodiment may specifically be a first device or a second device in the foregoing embodiments. The communication device 900 illustrated in FIG. 9 includes a processor 910. The processor 910 may invoke and run a computer program in a memory to implement the method in the embodiments of the present invention.

Optionally, as illustrated in FIG. 9, the communication device 900 may further include the memory 920. The processor 910 may invoke and run the computer program in the memory 920 to implement the method in the embodiments of the present invention.

The memory 920 may be an independent device independent of the processor 910 and may also be integrated into the processor 910.

Optionally, as illustrated in FIG. 9, the communication device 900 may further include a transceiver 930. The processor 910 may control the transceiver 930 to communicate with another device, specifically transmitting information or data to another device or receiving information or data transmitted by another device.

The transceiver 930 may include a transmitter and a receiver. The transceiver 930 may further include antennae, and there may be one or more antennae.

Figure 10:
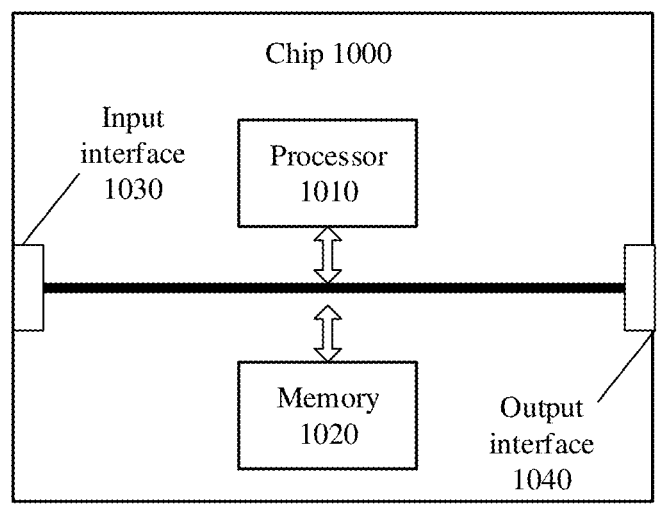
FIG. 10 is a schematic block diagram of a chip according to an embodiment of the present application.

FIG. 10 is a schematic diagram of a structure of a chip according to an embodiment of the present invention. The chip 1000 illustrated in FIG. 10 includes a processor 1010. The processor 1010 may invoke and run a computer program in a memory to implement the method in the embodiments of the present invention.

Optionally, as illustrated in FIG. 10, the chip 1000 may further include the memory 1020. The processor 1010 may invoke and run the computer program in the memory 1020 to implement the method in the embodiments of the present invention.

The memory 1020 may be an independent device independent of the processor 1010 and may also be integrated into the processor 1010.

Optionally, the chip 1000 may further include an input interface 1030. The processor 1010 may control the input interface 1030 to communicate with another device or chip, specifically acquiring information or data transmitted by another device or chip.

Optionally, the chip 1000 may further include an output interface 1040. The processor 1010 may control the output interface 1040 to communicate with another device or chip, specifically outputting information or data transmitted by another device or chip.

Optionally, the chip may be applied to the first device or the second device in the embodiments of the present invention, and the chip may implement corresponding flows in each method of the embodiments of the present invention. For simplicity, elaborations are omitted herein.

It is to be understood that the chip mentioned in the embodiment of the present invention may also be called as a system-level chip, a system chip, a chip system, or a system on chip.

It is to be understood that the processor in the embodiment of the present invention may be an integrated circuit chip and has a signal processing capability. During implementation, each step of the method embodiments may be completed by an integrated logical circuit of hardware in the processor or an instruction in a software form. The above processor may be a general processor, a Digital Signal Processor (DSP), an Application Specific Integrated Circuit (ASIC), a Field-Programmable Gate Array (FPGA) or other programmable logic devices, discrete gate or transistor logic devices, and discrete hardware components. Each method, step and logical block diagram disclosed in the embodiments of the present invention may be implemented or executed. The general processors may be microprocessors or the processor may also be any conventional processors. In combination with the method disclosed in the embodiments of the present invention, the steps may be directly implemented by a hardware processor, or may be performed by a combination of hardware and software modules in the decoding processor. The software module may be located in a mature storage medium in the field such as a Random Access Memory (RAM), a flash memory, a Read-Only Memory (ROM), a Programmable ROM (PROM) or Electrically Erasable PROM (EEPROM), and a register. The storage medium is located in a memory, and the processor reads information in the memory, and completes the steps of the method in combination with hardware.

It is to be understood that the memory in the embodiment of the present invention may be a volatile memory or a non-volatile memory, or may include both the volatile and non-volatile memories. The non-volatile memory may be an ROM, a PROM, an Erasable PROM (EPROM), an EEPROM or a flash memory. The volatile memory may be an RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that, the above memory is exemplarily but unlimitedly described that the memory in the embodiments of the present invention may further be as SRAM, a DRAM, an SDRAM, a DDR SDRAM, an ESDRAM, an SLDRAM, and a DR RAM. That is to say, the memory in the embodiments of the present invention is intended to include, but not limited to, memories of these and any other proper types.

An embodiment of the present invention further provides a computer-readable storage medium, configured to store a computer program.

Optionally, the computer-readable storage medium is applicable to a network device or a satellite in the embodiments of the present invention, and the computer program causes a computer to execute corresponding flows implemented by the network device in each method of the embodiments of the present invention. For simplicity, elaborations are omitted herein.

An embodiment of the present invention further provides a computer program product, including a computer program instruction.

Optionally, the computer program product is applicable to a network device or a satellite in the embodiments of the present invention, and the computer program instruction causes a computer to execute corresponding flows implemented by the network device in each method of the embodiments of the present invention. For simplicity, elaborations are omitted herein.

An embodiment of the present invention further provides a computer program.

Optionally, the computer program is applicable to a network device or a satellite in the embodiments of the present invention. When the computer program is run on a computer, the computer executes corresponding flows implemented by the network device in each method of the embodiments of the present invention. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such implementation shall fall within the scope of the present invention.

Those skilled in the art may clearly learn about that specific working processes of the system, apparatus, and units described above may refer to the corresponding processes in the above method embodiments and will not be elaborated herein for ease and briefness of description.

In several embodiments provided by the present invention, it is to be understood that the disclosed system, apparatus and method may be implemented in other ways. For example, the apparatus embodiment described above is only schematic, and for example, division of the units is only logic function division, and other division manners may be adopted during practical implementation. For another example, a plurality of units or components may be combined or integrated into another system, or some characteristics may be neglected or not executed. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated. The components displayed as units may or may not be physical units, that is, the components may be located in one place, or may be distributed on the plurality of network units. Part or all of the units may be selected according to actual requirements to achieve the purposes of the solutions of this embodiment.

In addition, the functional units in the various embodiments of the present invention may be integrated into one processing unit, or each unit may exist alone physically, or two or more than two units may be integrated into one unit.

If the function is implemented in the form of the software functional unit and sold or used as an independent product, it can be stored in the computer readable storage medium. Based on this understanding, the technical solutions of the present invention essentially or the parts that contribute to the prior art, or part of the technical solutions can be embodied in the form of a software product. The computer software product is stored in a storage medium, including a plurality of instructions for causing a computer device (which may be a personal computer, a server, or a network device, and the like) to execute all or part of the steps of the method described in the various embodiments of the present invention. The storage medium includes: various media capable of storing program codes such as a USB flash disk, a mobile Hard Disk Drive (HDD), an ROM, an RAM, a magnetic disk or an optical disk.

The above is only the specific implementations of the present invention and not intended to limit the scope of protection of the present invention. Any variations or replacements apparent to those skilled in the art within the technical scope disclosed by the present invention shall fall within the scope of protection of the present invention. Therefore, the scope of protection of the present invention shall be subject to the scope of protection of the claims.

The invention claimed is:

1. A resource selection method, comprising:
performing, by a first terminal device, resource selection at time n, and determining, by the first terminal device, a candidate resource set for transmitting sidelink data according to a sensing result,
wherein the sensing result comprises at least one of:
a sensing result that is obtained by the first terminal device performing sensing on at least one time unit after the time n; and
a sensing result that is obtained by the first terminal device performing sensing on at least one time unit before the time n,
wherein the method further comprises:
determining, by the first terminal device, at least one transmission period within a sensing range before the time n according to a sensing configuration parameter, and determining Y time units need to be sensed in each of the at least one transmission period, wherein Y is an integer greater than or equal to 1; and
performing, by the first terminal device, sensing on the Y time units in the at least one transmission period to obtain a fourth sensing result.

2. The method of claim 1, further comprising:
performing, by the first terminal device, sensing on a first time unit set after the time n to obtain a first sensing result,
wherein the first time unit set comprises A time units, and A is a positive integer.

3. The method of claim 2, wherein determining, by the first terminal device, the candidate resource set for transmitting sidelink data according to the sensing result comprises:
determining, by the first terminal device, the candidate resource set from a second time unit set according to the first sensing result, wherein time units in the second time unit set are located after time units in the first time unit set;
wherein a manner for determining A is one of the following:
determining according to a time interval of transmission resources indicated by Sidelink Control Information (SCI), or
determining according to a configuration parameter of a resource pool, or
determining according to network device configuration information.

4. The method of claim 1, further comprising:
selecting, by the first terminal device, a first transmission resource within a resource selection window, wherein a starting position of the resource selection window is determined according to a processing capability of the first terminal device, and an ending position of the resource selection window is determined according to a Package Delay Budget (PDB) of a service corresponding to the sidelink data;
wherein the method further comprises:
performing, by the first terminal device, sensing before a time corresponding to the first transmission resource, to obtain a second sensing result.

5. The method of claim 4, further comprising:
if the first transmission resource is determined to conflict with a second transmission resource for the second terminal device according to the second sensing result, reselecting the transmission resource;
wherein the method further comprises:
if the first transmission resource is determined to conflict with the second transmission resource for the second terminal device according to the second sensing result and a preset condition is met, reselecting the transmission resource;
wherein the preset condition comprises at least one of the following:
a service priority corresponding to the sidelink data is lower than a service priority corresponding to sidelink data carried in the second transmission resource; or
Reference Signal Receiving Power (RSRP), measured by the first terminal device, for the second terminal device is higher than a preset threshold value.

6. The method of claim 1, further comprising:
performing, by the first terminal device, sensing on a third time unit set before the time n to obtain a third sensing result,
wherein the third time unit set comprises B time units, and B is an integer greater than or equal to 1;
wherein determining the candidate resource set for transmitting sidelink data according to the sensing result comprises:
determining, by the first terminal device, the candidate resource set for transmitting the sidelink data according to the third sensing result;
wherein a manner for determining B is one of the following:
determining according to a time interval of transmission resources indicated by SCI, or
determining according to a configuration parameter of a resource pool, or
determining according to network device configuration information.

7. The method of claim 1, wherein determining, by the first terminal device, the candidate resource set for transmitting sidelink data according to the sensing result comprises:
determining, according to the fourth sensing result, the candidate resource set for transmitting the sidelink data from Y time units within the resource selection window;
wherein the sensing configuration parameter comprises: a number of sensing time units.

8. The method of claim 1, wherein determining, by the first terminal device, the candidate resource set for transmitting sidelink data according to the sensing result comprises:
determining, according to the first sensing result and the fourth sensing result, the candidate resource set for transmitting the sidelink data from Y time units within the resource selection window; or
determining, according to the second sensing result and the fourth sensing result, the candidate resource set for transmitting the sidelink data from Y time units within the resource selection window.

9. The method of claim 1, wherein the time n is: a time when the high layer of the first terminal device triggers performing resource selection;
wherein the time unit is a slot.

10. A terminal device, comprising a processor and a memory configured to store a computer program executable by the processor, wherein the memory is configured to store the computer program, and the processor is configured to call and execute the computer program stored in the memory to:

perform resource selection at time n, and determine a candidate resource set for transmitting sidelink data according to a sensing result, wherein the sensing result comprises at least one of:

a sensing result that is obtained by performing sensing on at least one time unit after the time n; and a sensing result that is obtained by performing sensing on at least one time unit before the time n, wherein the processor is further configured to perform sensing on the Y time units in the at least one transmission period to obtain a fourth sensing result; and the processor is configured to determine at least one transmission period within a sensing range before the time n according to a sensing configuration parameter, and determine Y time units need to be sensed in each of the at least one transmission period, wherein Y is an integer greater than or equal to 1.

11. The terminal device of claim 10, wherein the processor is further configured to:

perform sensing on a first time unit set after the time n to obtain a first sensing result, wherein the first time unit set comprises A time units, and A is a positive integer.

12. The terminal device of claim 11, wherein the processor is configured to determine the candidate resource set from a second time unit set according to the first sensing result, wherein time units in the second time unit set are located after time units in the first time unit set;

wherein a manner in which the processing unit determines A is one of the following:

determining according to a time interval of transmission resources indicated by Sidelink Control Information (SCI), or determining according to a configuration parameter of a resource pool, or determining according to network device configuration information.

13. The terminal device of claim 10, wherein the processor is configured to select a first transmission resource within a resource selection window, wherein a starting position of the resource selection window is determined according to a processing capability of the terminal device, and an ending position of the resource selection window is determined according to a Package Delay Budget (PDB) of a service corresponding to the sidelink data;

wherein the processor is further configured to:

perform sensing before a time corresponding to the first transmission resource, to obtain a second sensing result.

14. The terminal device of claim 13, wherein the processor is configured to, if the first transmission resource is determined to conflict with a second transmission resource for the second terminal device according to the second sensing result, reselect the transmission resource;

wherein the processor is configured to, if the first transmission resource is determined to conflict with the second transmission resource for the second terminal device according to the second sensing result and a preset condition is met, reselect the transmission resource;

wherein the preset condition comprises at least one of the following:

a service priority corresponding to the sidelink data is lower than a service priority corresponding to sidelink data carried in the second transmission resource; or Reference Signal Receiving Power (RSRP) for the second terminal device is measured to be higher than a preset threshold value.

15. The terminal device of claim 10, wherein the processor is further configured to:

perform sensing on a third time unit set before the time n to obtain a third sensing result, wherein the third time unit set comprises B time units, and B is an integer greater than or equal to 1;

wherein the processor is configured to determine the candidate resource set for transmitting the sidelink data according to the third sensing result;

wherein a manner in which the processing unit determines B is one of the following:

determining according to a time interval of transmission resources indicated by SCI, or determining according to a configuration parameter of a resource pool, or determining according to network device configuration information.

16. The terminal device of claim 10, wherein the processor is configured to determine, according to the fourth sensing result, the candidate resource set for transmitting the sidelink data from Y time units within the resource selection window;

wherein the sensing configuration parameter comprises: a number of sensing time units.

17. The terminal device of claim 10, wherein the processor is configured to determine, according to the first sensing result and the fourth sensing result, the candidate resource set for transmitting the sidelink data from Y time units within the resource selection window; or the processor is configured to determine, according to the second sensing result and the fourth sensing result, the candidate resource set for transmitting the sidelink data from Y time units within the resource selection window.

18. The terminal device of claim 10, wherein the time n is: a time when the high layer of the first terminal device triggers performing resource selection;

wherein the time unit is a slot or a subframe.

* * * * *